United States Patent
Scheideler et al.

(10) Patent No.: US 12,468,953 B2
(45) Date of Patent: *Nov. 11, 2025

(54) SELF-LEARNING AND ADAPTING CYBER THREAT DEFENSE

(71) Applicant: Kyndryl, Inc., New York, NY (US)

(72) Inventors: Tim Uwe Scheideler, Schoenenberg (CH); Arjun Udupi Raghavendra, Zurich (CH); Matthias Seul, Pleasant Hill, CA (US); Andrea Giovannini, Zurich (CH)

(73) Assignee: Kyndryl Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,415

(22) Filed: May 30, 2024

(65) Prior Publication Data
US 2024/0320499 A1    Sep. 26, 2024

Related U.S. Application Data

(63) Continuation of application No. 17/249,133, filed on Feb. 22, 2021, now Pat. No. 12,039,455.

(51) Int. Cl.
*G06N 3/088* (2023.01)
*G06F 21/56* (2013.01)
*G06N 3/045* (2023.01)

(52) U.S. Cl.
CPC .............. *G06N 3/088* (2013.01); *G06F 21/56* (2013.01); *G06N 3/045* (2023.01); *G06F 2221/034* (2013.01)

(58) Field of Classification Search
CPC ........ G06N 3/088; G06N 3/045; G06F 21/56; G06F 2221/034
See application file for complete search history.

(56) References Cited

U.S. PATENT DOCUMENTS

| | | |
|---|---|---|
| 8,813,228 B2 | 8/2014 | Magee |
| 9,665,713 B2 | 5/2017 | Avasarala |
| 2019/0215329 A1 | 7/2019 | Levy |

OTHER PUBLICATIONS

Burks et al., "Data Augmentation with Generative Models for Improved Malware Detection", IEEE, 2019, pp. 1-6.

(Continued)

*Primary Examiner* — Pei Yong Weng
(74) *Attorney, Agent, or Firm* — Erik Swanson; Andrew D. Wright; Calderon Safran & Wright P.C.

(57) ABSTRACT

The exemplary embodiments disclose a method, a computer system, and a computer program product for detecting malware. The exemplary embodiments may include aggregating known malware patterns by storing malware patterns and related malware categories of the malware patterns. The exemplary embodiments may additionally include training a first machine-learning system, comprising a generator portion and a discriminator portion, by using the known malware patterns and the related malware categories as training data. The exemplary embodiments may also include generating additional synthetic code patterns by feeding random code samples to the trained first machine-learning system. The exemplary embodiments may further include training a second machine-learning system by using benevolent code patterns and the generated additional synthetic code patterns as training data. The exemplary embodiments may include determining a statistical distribution of predicted malicious code patterns and related categories, and determining a quality value of the training of the second machine-learning system.

20 Claims, 16 Drawing Sheets

(56) References Cited

OTHER PUBLICATIONS

Castro et al., "Poster: Training GANs to Generate Adversarial Examples Against Malware Classification", 2019, https://www.ieee-security.org/TC/SP2019/posters/hotcrp sp 19posters-final34.pdf, pp. 1-2.
Chen et al., "Towards resilient machine learning for ransomware detection", arXiv:1812.09400v2, [cs.LG]. May 16, 2019, KDD, pp. 1-10.
Generative Malware Outbreak Detection.
Goyal, "GANs—A Brief Introduction to Generative Adversial Networks", https://medium.com/analytics-vidhya/gans-a-brief-introduction-to-genera . . . , Jun. 2, 2009, pp. 1-6.
Hu et al., "Generating Adversarial Malware Examples for Black-Box Attacks Based on GAN", https://arxiv.org/abs/1702.05983, Feb. 20, 2017, pp. 1-7.
Kim et al., "Malware Detection Using Deep Transferred Generative Adversarial Networks", Springer International Publishing, AG, 2017, pp. 556-564.
Kim et al., "Zero-day malware detection using transferred generative adversial networks based on deep autoencoders", Elsevier, Information Sciences, 2018, 460-461, pp. 83-102.
Lu et al., "Generative Adversarial Network for Improving Deep Learning Based Malware Classification", Proceedings of the 2019 Winter Simulation Conference, IEEE, 2019, pp. 584-593.
MAEC, "5 Specification Reference", https://maecproject.github.io/documentation/maec5-docs/#introduction 1 of, accessed Feb. 22, 2021, pp. 1-58.
Mell et al., "The NIST Definition of Cloud Computing", National Institute of Standards and Technology, Special Publication 800-145, Sep. 2011, pp. 1-7.
Salimans et al., "Improved Techniques for Training GANS", arXiv:1606.03498v1, [cs.LG], Jun. 10, 2016, pp. 1-10.
Skipper, "How Machine Learning and AI Fit Into Information Security", https://blogs.vmware.com/networkvirtualization, Sep. 29, 2020, pp. 1-7.
Springenberg, "Unsupervised and Semi-Supervised Learning with Categorical Generative Adversarial Networks", ICLR, https://arxiv.org/pdf/1511.06390.pdf, Apr. 2016, pp. 1-20.
STIX, "Introduction to STIX", https://oasis-open.github.io/cti-documentation/stix/intro.html, accessed Feb. 22, 2021, pp. 1-6.
Wikipedia, "Metasploit Project", https://en.wikipedia.org/wiki/Metasploit_Project, accessed Feb. 22, 2021, pp. 1-6.
List of Kyndryl Patents or Patent Applications Treated as Related, dated May 30, 2024, 2 pages.

SELF-LEARNING AND ADAPTING CYBER THREAT DEFENSE

BACKGROUND

The invention relates generally to a method for a detection of malware, and more specifically, to a computer-implemented method for building a multi-category machine-learning system for a detection of malware. The invention relates further to a multi-category machine-learning system for detection of malware, and a computer program product.

Cyber security attacks have been one of the top three priorities of IT (information technology) organizations and enterprises and government organizations for years. The role of the chief information security officer (CISO) is a matter of course in any IT organization. Most of the security information and event monitoring (SIEM) solutions available on the market require a set of complex correlation rules monitored and tuned by highly skilled personnel, in order to identify and detect potential security threats which may lead to security incidents in at least one part of an organization. According to the general and data security regulation (GDPR), companies operating in the European Union may face high monetary fees if it turns out that they have failed to protect their customers and/or employees' data. However, protecting enterprise data against malware is not only a topic for European-based enterprises and government organizations but for all entities dealing with data around the world.

SUMMARY

The exemplary embodiments disclose a method, a computer system, and a computer program product for detecting malware. The exemplary embodiments may include aggregating known malware patterns by storing malware patterns and related malware categories of the malware patterns. The exemplary embodiments may additionally include training a first machine-learning system, comprising a generator portion and a discriminator portion, by using the known malware patterns and the related malware categories as training data. The exemplary embodiments may also include generating additional synthetic code patterns by feeding random code samples to the trained first machine-learning system. The exemplary embodiments may further include training a second machine-learning system by using benevolent code patterns and the generated additional synthetic code patterns as training data. The exemplary embodiments may include determining a statistical distribution of predicted malicious code patterns and related categories, and determining a quality value of the training of the second machine-learning system.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
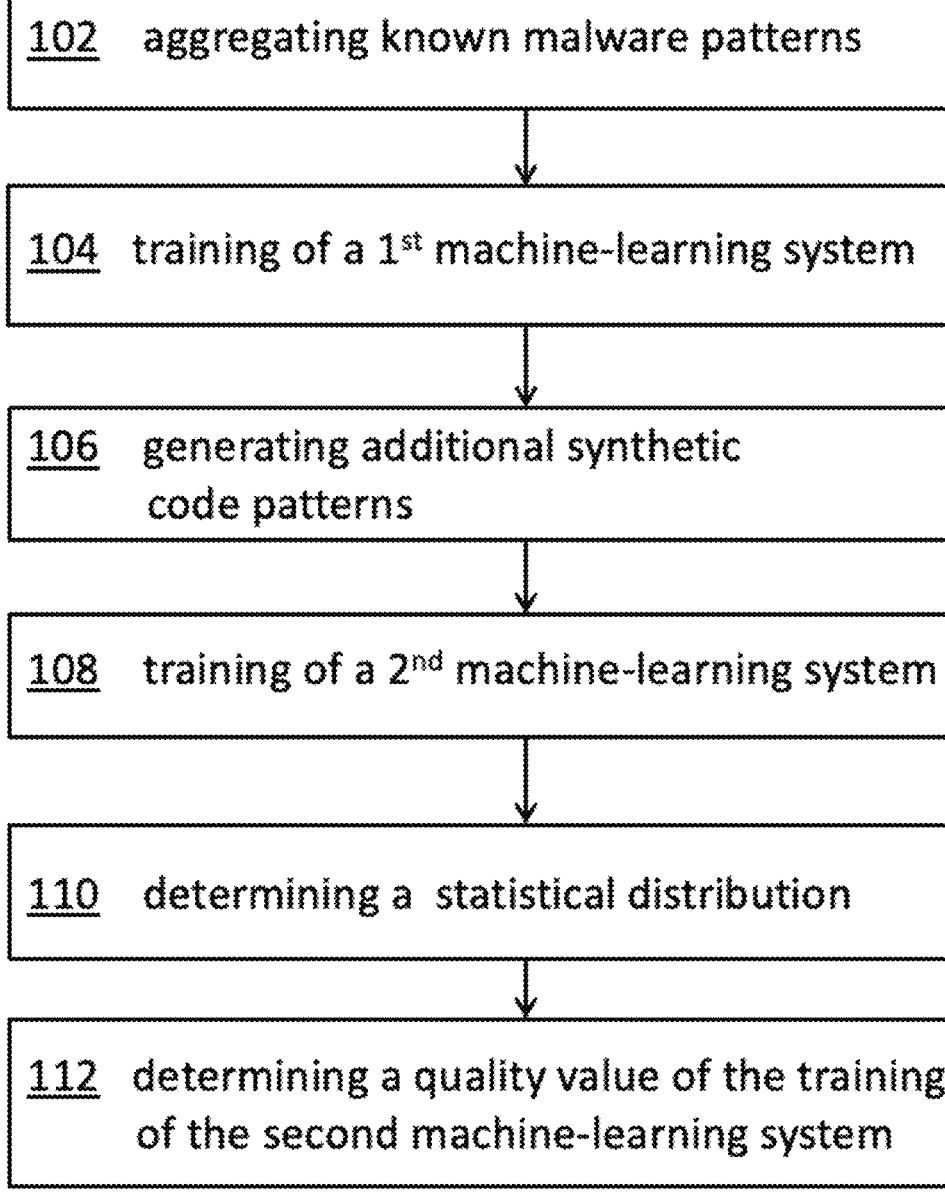
FIG. 1 depicts an exemplary block diagram of an embodiment of the inventive computer-implemented method for building a multi-category machine-learning system for a detection of malware, in accordance with the exemplary embodiments.

In the context of this description, the following conventions, terms and/or expressions may be used:

The term 'malware' may denote any software intentionally designed to cause damage to a computer and/or a network system. The malware may comprise any of the wide variety of malware types existing like computer viruses, worms, Trojan horses, ransomware, spyware, adware, rogue software, wiper and scareware. It may also denote any additional types of malicious computer programs or parts thereof not intended for use of a specific computer system, and those being developed in the future.

The term 'multi-category machine-learning system' may denote an artificial intelligence system that is optimized to differentiate and predict various predefined categories for received input samples. Thereby, it may be reflected that the input samples already belong to one of the predefined categories. Training for this behavior may require the data pattern itself, its related labels (e.g., malware or non-malware) and a related predefined category as input.

The term 'known malware patterns' may denote those malware code patterns which have been detected in the past and may have been investigated and categorized.

The term 'malware category' may relate to a tighter characteristic of a specific malware code pattern. One of the above-mentioned categories under the definition of "malware" may be used. However, any other categorization may be used instead. Some of these categorizations may describe malware for specific computing architectures, network architectures or memory architectures, and the like.

The term 'first machine-learning system' may denote, e.g., a neural network of a special kind like a generative adversarial network (GAN). This special class of machine-learning frameworks comprising two neural networks (each of which comprising a plurality of layers of nodes selectively connected to each other) being in contest with each other in a game-like fashion. The two neural networks may be denoted as generator and discriminator enabling the first machine-learning system to be trained in an unsupervised manner.

However, the first ML system may as well be a category-aware generated adversarial network, i.e., CatGAN. It may be enabled to measure a difference between real samples and artificially generated samples on each predefined category. Reducing the difference will guide the underlying ML model to generate and predict high-quality category samples. Experimental results have demonstrated that a CatGAN outperforms most of the existing state-of-the-art methods.

The term 'generator portion'—e.g., of the first ML system—may denote a first part of the GAN or CatGAN responsible for generating candidates to be evaluated by the discriminative network, i.e., the second part of the GAN. The generator portion will also stay in competition to the discriminator portion (see below) in a productive phase of the GAN.

The term 'discriminator portion' may denote the second part of the GAN or CatGAN. A known dataset may serve as the initial training data for the discriminator or discriminator portion. Training may involve presenting it with samples from a training dataset, until it may achieve acceptable prediction accuracy. On the other side, the generator portion may be seeded with randomized input that may be sampled from a predefined latent space, e.g., a multi-variant normal distribution. Thereafter, candidates synthesized by the generator may be evaluated by the discriminator. Independent back propagation procedures may be applied to both networks so that the generator produces better results while the discriminator becomes more skilled at flagging synthetic samples. It may also be noted that the generator may typically be a deconvolution neural network, while the discriminator may typically be a convolutional neural network.

The term 'synthetic code patterns' may denote those code portions being generated by the generator portion of the GAN or CatGAN once it has been trained. Thereby, it may receive input in form of random patterns.

The term 'malware probability value' (P(S)) may denote a mathematical real value—e.g., in the range of 0 to 1-indicative of the prediction probability of a machine-learning system that a code pattern may be malware. Consequently, the related value 1 minus the malware probability value is the probability that a given code pattern does not belong to the hyper-group—i.e., a code pattern relating to any of the predefined categories—of malware or exploits.

The term 'category probability value' may denote that a received artificially generated synthetic code pattern—i.e., a synthetic code pattern—may belong to a predefined category or class. This prediction may be performed by the discriminator portion of the first ML system.

The term 'additional synthetic code patterns' may denote synthetic code patterns being generated with a completely trained first machine-learning system.

The term 'second machine-learning system' may denote an auto-encoder, or in particular a conditional variational auto-encoder system, i.e., CVAE. It is an extension of a variational auto-encoder (VAE). The underlying auto-encoder may be a type of artificial neural network typically used to learn efficient data codings in an unsupervised manner. The aim of an auto-encoder is to learn a representation (encoding) for a set of data, typically for dimensionality reduction, by training the network to ignore signal "noise". After the dimensionality reduction, a reconstruction side is trained to learn to generate, from the reduced encoding a representation as close as possible to its original input.

In general, the CVAE may be a conditional directed graphic model whose input observations may modulate the prior of the Gaussian latent variables that generate the output. It is typically trained to maximize the conditional marginal log-likelihood.

The term 'benevolent code patterns' may denote well behaving program code which may be intended to be part of, e.g., an application program, a user interface, an operating system or an intermediate layer.

The term 'statistical distribution' may denote here the number, or relative number, of predicted malware, i.e., synthetically generated code patterns, in each of the predefined categories.

The term 'quality value' or performance may denote an indicator for a prediction accuracy of an ML system.

The term 'predict' or 'prediction' may denote the result of a trained machine-learning model after having received unknown input.

The term 'malware code pattern' may denote software program code identifiable as malicious program code fraction.

The term 'exploit code pattern' may denote a tool for hackers representing a systematic possibility to address and attack security holes of software and computer systems. As an example, a SQL statement (structured query language) may comprise, as part of a query, executable code compromising the security of the data in the database. Other exploits are using not strictly or stringently programmed application programming interfaces. An exploit may also be a sequence of commands that may take advantage of a bug or vulnerability to cause unintended or unanticipated behavior to occur on computer software or hardware. Finally it aims to gain control of a computer system allowing, e.g., privilege escalation or a denial-of-service attack.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

In the following, a detailed description of the figures will be given. All instructions in the figures are schematic. Firstly, a block diagram of an embodiment of the inventive computer-implemented method for building a multi-category machine-learning system for a detection of malware is given. Afterwards, further embodiments, as well as embodiments of the multi-category machine-learning system for a detection of malware, will be described.

FIG. 1 shows a block diagram of a preferred embodiment of the computer-implemented method 100 for building a multi-category machine-learning system for a detection of malware. The method 100 comprises aggregating, 102, known malware patterns from existing sources into a database or similar by storing the malware patterns and their related malware category. The method 100 also comprises training, 104, of a first machine-learning system comprising a generator portion and a discriminator portion—e.g., a GAN or CatGAN—thereby building a first machine-learning model using, for the training, the known malware patterns and the related malware category as training data until the discriminator is unable to differentiate between known malware patterns and synthetic code patterns, wherein the discriminator is enabled to output a malware probability value, i.e., P(S) that a synthetic code pattern S is malware—or not—and a category probability value, i.e., P(k,S) indicative of a category k of the synthetic code pattern S.

The method 100 comprises further generating, 106, additional synthetic code patterns by feeding additional random code samples to the trained first machine-learning system, in particular after the initial training and not as part of it.

Additionally, the method 100 comprises training, 108, of a second machine-learning system—e.g. an auto-encoder or a CVAE-thereby building a second machine-learning model using the generated additional synthetic code patterns and benevolent code patterns as training data until the second machine-learning system is enabled to predict malicious ones of the additional synthetic code patterns and related categories for the additional synthetic code patterns. It shall also be noted that those predictions not identifying malicious one of the additional synthetic code patterns are not malware code patterns.

Furthermore, the method 100 comprises determining, 110, a statistical distribution of the predicted malicious ones of the additional synthetic code patterns and related categories for the additional synthetic code patterns, i.e., of the output of the auto-encoder, and determining, 112, a quality value—i.e., a performance value—of the training of the second machine-learning system, wherein the quality value is a function of an ability of the second machine-learning system to predict correctly that one of the aggregated categorized known malware patterns is malware of a certain category.

Figure 2:
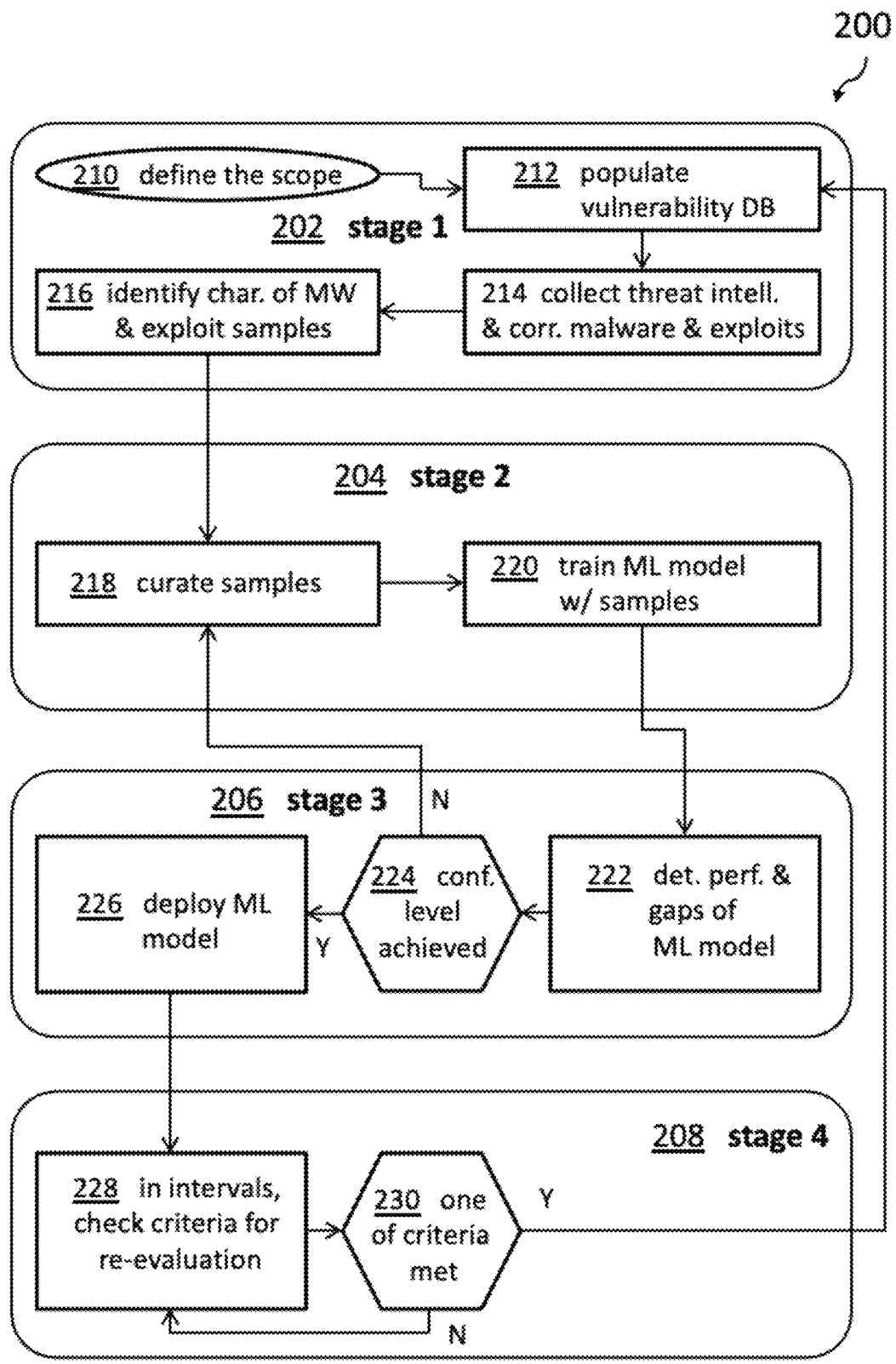
FIG. 2 depicts an exemplary block diagram of an overview of stages of an embodiment of the proposed concept, in accordance with the exemplary embodiments.

FIG. 2 shows a block diagram 200 of an overview of the stages 202, 204, 206, 208 an embodiment of the proposed concept. In stage 1202, the sample provision stage, the scope is defined, 210, a white durability database is populated (i.e., made publicly available), 212, a collection of threat intelligence and corresponding malware and exploit samples are gathered, 214, and characteristics of malware and exploit samples are identified, 216.

During stage 2, 204, the sample curation and training stage, the available samples of malware and exploits are curated, 218, and a machine-learning model is trained, 220, with the samples.

In stage 3 206, the evaluation and deployment stage, the performance and gaps in the machine-learning model is determined 222 and a decision is made whether a desired confidence level is already achieved, 224. If that is not the case—case "N"—the process returns back to stage 2, in particular the curation of the samples, 218. In case the desired confidence level is achieved—case "Y"—the machine-learning model is deployed, 226.

Last but not least, in stage 4, 208, the re-evaluation stage, criteria for a re-evaluation are checked, 228, in intervals, and if that is the case—case "Y"—the process returns back to see whether there are new populated point durability database entries. Otherwise (230), the process loops back—case of "N"—to a re-evaluation in intervals, 228.

Figure 3:
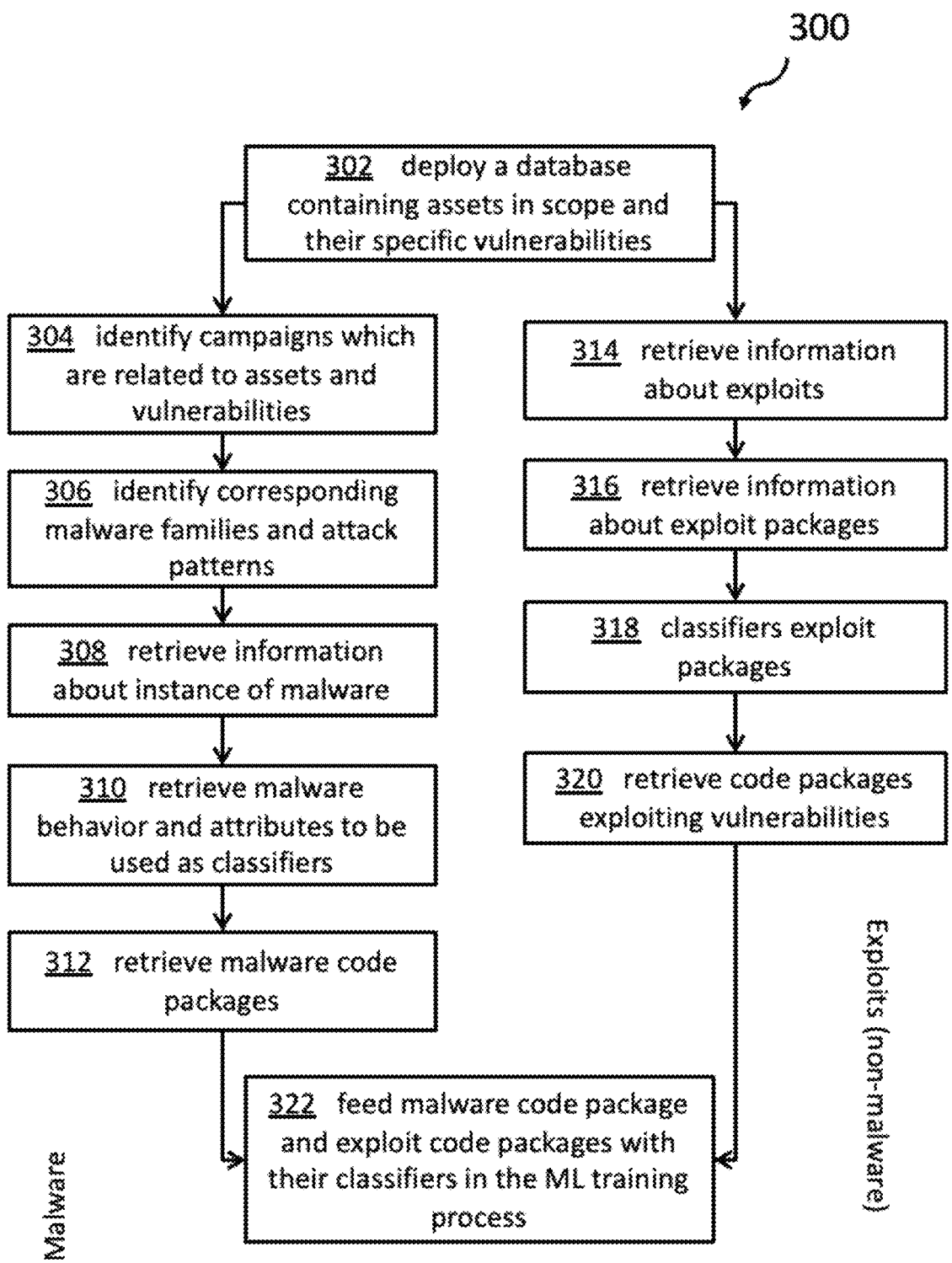
FIG. 3 depicts an exemplary block diagram of steps for an aggregation of malware code patterns, in accordance with the exemplary embodiments.

FIG. 3 shows a block diagram 300 of steps for an aggregation of malware code patterns of an embodiment, thus physically stage 1, according to FIG. 2.

In this stage, the solution will use existing samples of the to-be-trained material, e.g., malware, to distinguish specific characteristics. These characteristics are expressed by type and strength of expression. Typically, the types include metadata such as file size, architecture, linked libraries, signatures, compiler used, compression used, origin flags, etc., content such as binary structure, decompiled structure, included patterns, included payloads, etc., statically determined behavior from static code analysis, etc., and observed behavior from execution in sandboxes, samples from the field, etc.

The strength of expression determines how indicative the characteristics are observed in a given sample. The score is determined from 0 (not indicative) to 1 (absolute certainty). For straightforward characteristics, e.g., "IS_WIN32_EXECUTABLE", this can be a simple binary, yes/no, statement. For core complex characteristics, such as "USES_CNC_SERVER", this can vary, with internet communication libraries just adding a small amount of strength (0.1) and plain-text references to know Command & Control (C&C) server URLs going very strong (0.9).

Data for inclusion can come from many forms, such as existing sample databases, IoC (Indicate of compromise) libraries, OSINT (Open Source Intelligence) or commercial threat intelligence feeds.

In one implementation, the solution uses both pre-labeled data as well as ML (machine-learning) approaches to learn characteristics from provided samples, differentiating between malware exhibiting specific behaviors vs. regular software.

Unlike existing ML-based threat detection methods, the solution not only determines whether a particular example is malware or not, but uses occurrence and differentiation learning to narrow down which specific patterns in a particular file actually add these specific characteristics—or in other words, the solution seeks to determine the exact patterns, inclusions, etc., that indicate a particular characteristic to be exhibited, thereby creating a pool of code/pattern samples that can later be used to generate samples. In one implementation, the solution also ingests existing malware source code or scripts to be included in the sample pool.

As a result, stage 1 (compare FIG. 2) produces a database of characteristics with individual code/script/pattern samples that will exhibit a given characteristic with a certain strength value.

For example, for the characteristic "USES_CNC_SERVER" (CNC=Command aNd Control), it may include a 0.1 strength sample that includes internet connectivity library ("#include <sys/socket.h>"), as well as, a sample calling a known CNC server, e.g., clientService.sin_addr.s_addr=inet_addr("http://431tryme-.sharkservers.co.uk/yahooimg/iq20000"; with a strength value of 0.9.

In addition to a database focused on malware, the solution can also leverage a database of "known good" samples, both to identify which characteristics to ignore/skip and also which characteristics are just common to files on a given operating system, e.g., base system call libraries, to avoid absurd situations.

According to one aspect, the inventive concept generates and implements an ML model that is applied to the given specific environment to detect cyber-attacks and that offers many advantages. Advantages include efficient use of computational effort for training (and continuous retraining), the size of the model used is no larger than required, the confidence level for detecting specifics is higher than in a more general model, and the computation effort for checking incoming samples in the running phase is reduced and optimized.

In order to realize these advantages, in the first step 302 a configuration database is populated with the existing assets in scope. Additionally, information about vulnerabilities of these assets is stored in the database. In one implementation it is obtained from a vulnerability scanner, in another implementation it is obtained from threat intelligence sources.

In step 304, information about campaigns is retrieved from threat intelligence sources and those campaigns that target the assets and their vulnerabilities in scope are identified and stored in the system.

In step 306, information about the malware (e.g., malware type and name) utilized in the said campaigns is obtained from publicly available sources; for instance from STIX (structured threat information expression) malware, ATT&CK (at the serial tactics, technique & common knowledge) software, and MITRE (company name) ATT&CK techniques and attack patterns. This structured threat intelligence information contains the STIX Domain Object which is used to look up the MAEC (malware attribute enumeration and characterization) malware family.

Based on the information provided by step 306, in step 308, informational malware instances are retrieved from a threat intelligence source that contains the names of the code packages, the known versions, and details of which version is targeting a particular asset and specific vulnerability.

Using the attribute-based structure defined in MAEC, malware behavior is obtained from the MAEC common behavior reference in step 310. The behavior is used as a malware category classifier in the ML process, allowing assigning a malware to one of the K categories.

In step 312, the actual malware (binary code) is obtained from threat intelligence and stored.

In parallel, the method performs corresponding steps for non-malware which are exploiting a vulnerability without placing malicious code (e.g., virus) on the target. Well known examples are cross-site scripting and SQL-injections.

In step 314, information about exploits aiming at the assets in scope and their vulnerabilities are obtained from threat intelligence.

In step 316, the information about exploit packages is retrieved, from an instance from Metasploit (a product name).

In step 318, the structured information retrieved per package is used to create category classifiers, for instance type of vulnerability exploited, technique used (injection, scripting, scanning, etc.), so that each code package is in one of the K categories. In step 320, the corresponding code packages are obtained, either from Metasploit, from other threat intelligence sources or from the asset vendor who publishes them to support security tool developers.

In step 322, the malware and exploit code packages are stored in a database alongside with their classifiers, names, and additional information retrieved from threat intelligence.

Finally, it may be noted that the left arm of FIG. 3 is related to malware, whereas the right arm of the figure is related to exploits.

Figure 4:
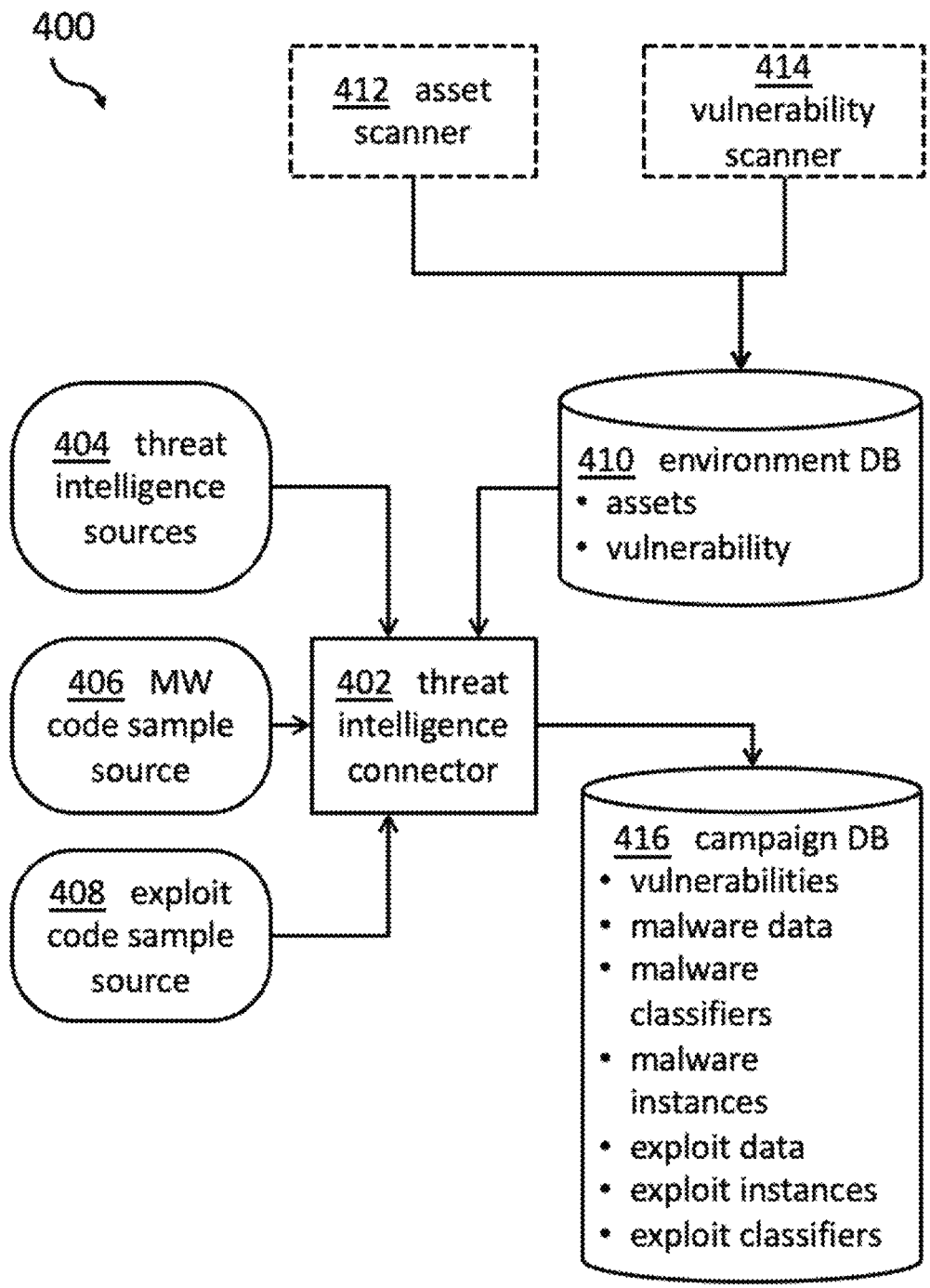
FIG. 4 depicts an exemplary block diagram of components of an embodiment of how to collect samples of malware code patterns, categories, and sources, in accordance with the exemplary embodiments.

FIG. 4 shows another block diagram 400 of components of an embodiment of how to collect samples of malware code patterns, categories and sources. An instrumental component in the component diagram below is the threat intelligence collector 402 which ingests asset and vulnerability information about the environment in scope (environment DB 410), matches this information with information from threat intelligence sources 404 and retrieves the actual malware 406 and exploit code 408 samples, which are stored in the campaign database 416. The environment DB 410 can be filled with data from asset scanners 412 and vulnerability scanners 414.

Figure 5:
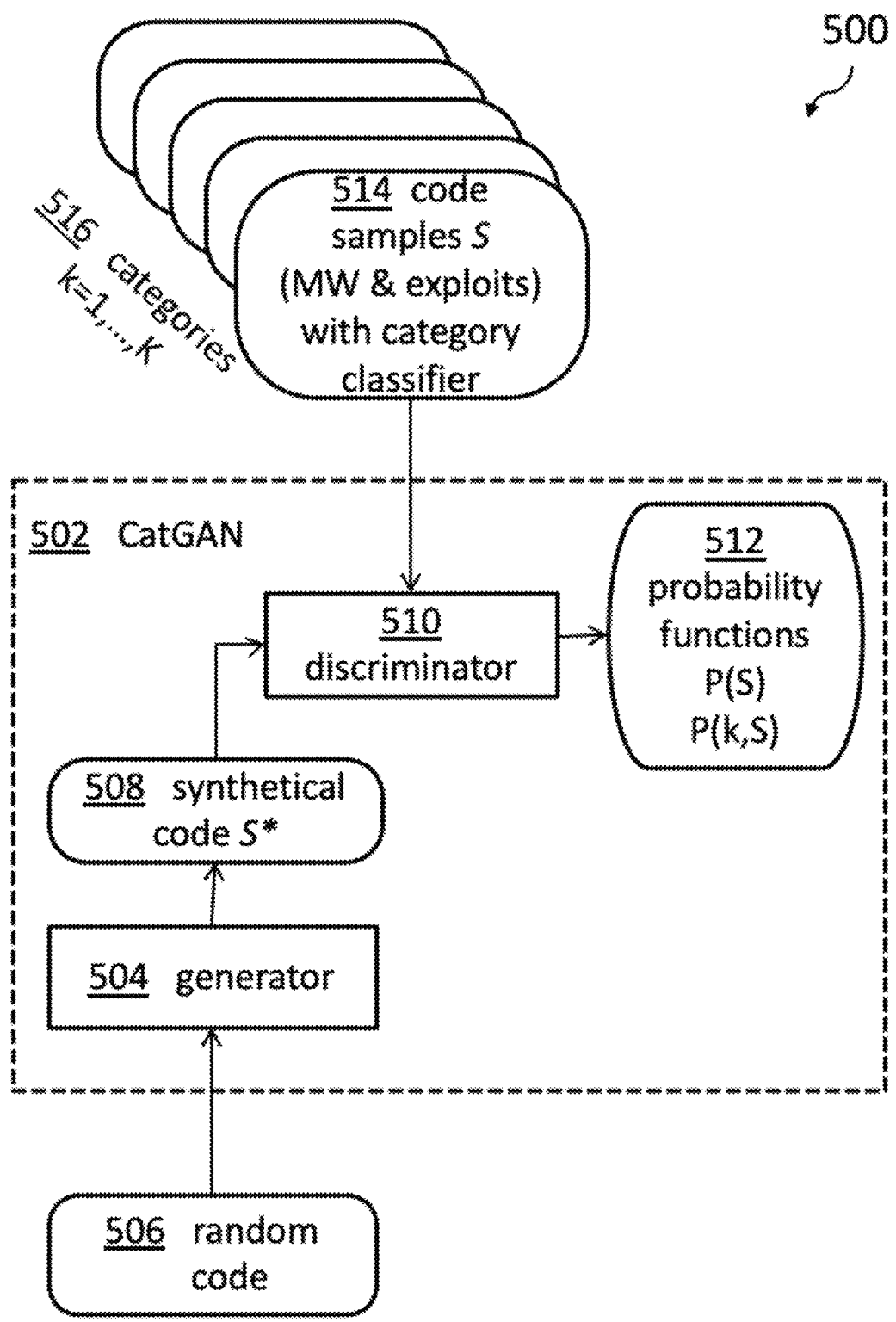
FIG. 5 depicts an exemplary block diagram of how a CatGAN may be used for a creation of synthetic code patterns, in accordance with the exemplary embodiments.

FIG. 5 shows a block diagram 500 of how a CatGAN 500 may be used for a creation of synthetic code patterns of an embodiment. This training stage (stage, compare FIG. 2) comprises two subsequent steps: (i) produce a wide range of synthetic malware using ML techniques and (ii) train an ML model using the samples generated in step (i).

Step 1: Produce a Wide Range of Synthetic Malware Using ML Techniques

The method uses ML techniques to create a multitude of malware with similar characteristics as the samples exhibit. More precisely, the resulting synthetic malware exhibits a normal distribution of malware characteristics, i.e., many samples are very similar and with decreasing frequency of occurrence the similarity decreases. Including these not so similar samples in the ML model allows the system actually to detect "future" malware, i.e., malware that is either not yet written or not yet available in threat intelligence sources but is an enhanced derivative of existing malware.

The created new files do not need to be executable, running or even resembling what a human would consider a workable file. For the purposes of training the ML model, this can actively reduce noise in the ML model, amplifying specifically the samples that need to be trained on. The solution may generate thousands of samples, depending on the available combination of samples.

The preferred implementation for ML sample generation is a Generative Adversarial Network (GAN). A GAN comprises two neural networks—i.e., the generator 504 and the discriminator 510—performing an adversarial process. Both neural networks are trained simultaneously in an unsupervised learning process. The generator G 504 creating new, fake samples (synthetic code S*508) resembling the distribution of real sample code S so that the discriminator D 510 can distinct only with decreasing probability whether a sample is real (i.e., originating from the initial sample set) or fake (i.e., produced by the generator from seed random code 506).

The original GAN is "one dimensional", i.e., the GAN can generate a distribution of samples around one objective derived from the real input data, and therefore cannot handle multiple distinct features and/or characteristics of the input data as all features are blurred into each other.

The preferred embodiment of this inventive concept uses a Categorical GAN (CatGAN) 502. A CatGAN 502 allows unsupervised learning using a multi-featured data set of unlabeled examples as input and semi-supervised learning using labeled examples. The latter is used in our case as the malware and exploit code samples are labeled with their classifiers or categories.

This allows for the utilization of a sufficiently large amount of real code samples with various classifiers as input for a single CatGAN 502, for the performing of a quality check and possibly required retraining per classifier or category 516, and defining margins in terms of the mean square error allowed during the detection process per classifier or category 516.

The malware and exploit code samples 514 are fed into the CatGAN 502. During the process the value function V(D,G) is minimized for the generator G 504 and maximized for the discriminator D 510, so that in an ideal case the discriminator D 510 can only state with 50% probability whether the current input is a real code sample or synthetic code produced by the generator G 504.

While the function by P(S) provides the statement "is real" vs. "is fake", the probability function P(k,S) (see 512) provides a probability that certain sample belongs to category k 516. Similar to an adversarial process that generates improved fake samples and discriminates better between real and fake, the generator aims for an evenly distributed result of P(k,S) (meaning the each P(k,S) for k=1, . . . ,K has the same value P(k,S)=1/K), the discriminator aims to have P(k,S) for one k close to 1 while for all other categories P(k,S) is close to 0.

In a pre-step, i.e., before the generator is fed with random code (i.e., code that is generated using a random symbol generator), the generator would be trained with code samples 514 of known malware and exploits.

Figure 6:
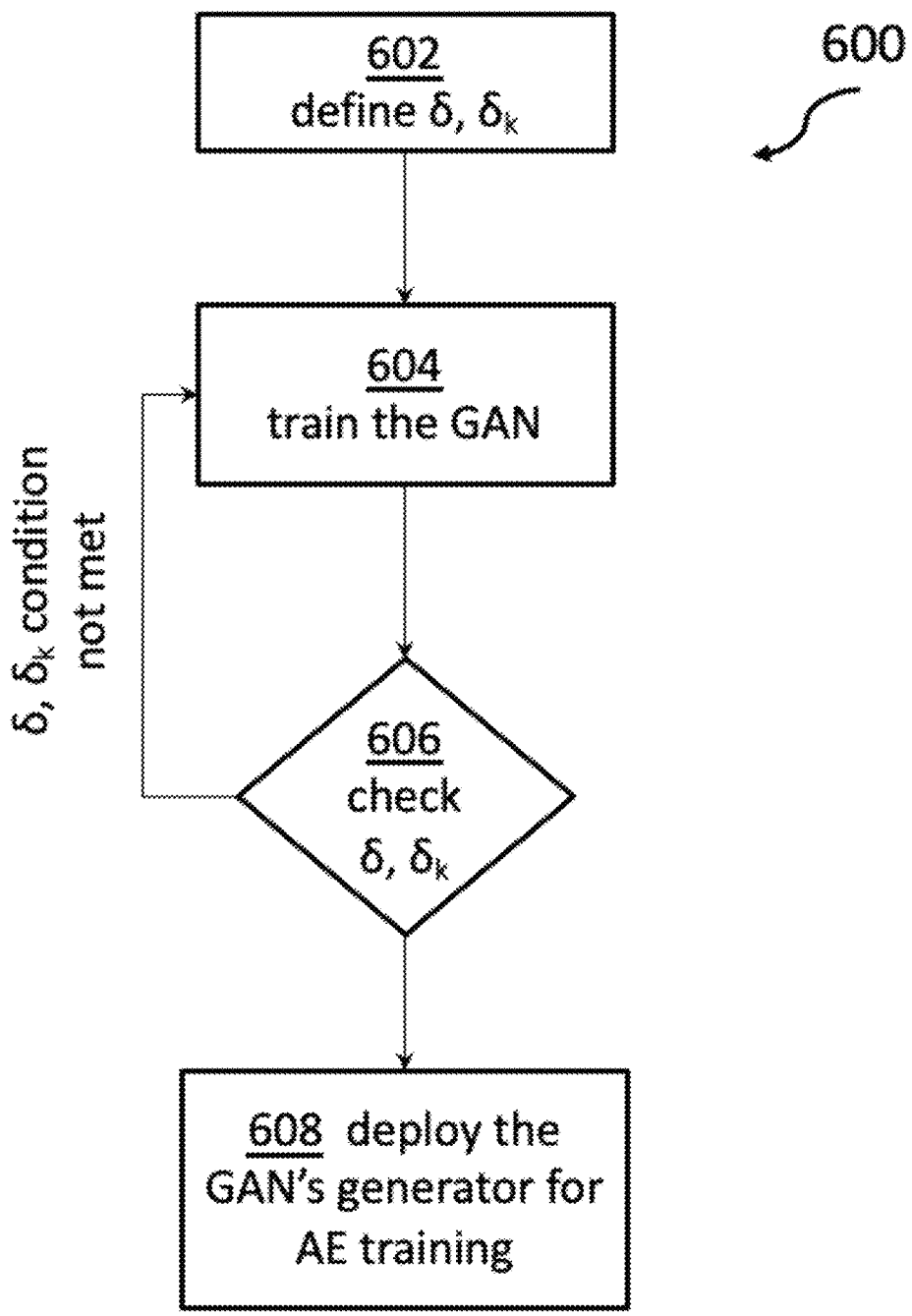
FIG. 6 depicts an exemplary block diagram of how to develop a single instance of a CatGAN for auto-encoder training, in accordance with the exemplary embodiments.

FIG. 6 shows a block diagram 600 of how to develop a single instance of a GAN or CatGAN according to one embodiment. One or a combination of the following stopping conditions may be used to terminate the generation of synthetic code. The generation of synthetic code may be terminated if the probability function is close to 0.5: | P(k,S)—0.5|<δ (e.g. δ=0.01) in average across categories. The generation of synthetic code may be terminated if the probability function is close to 0.5: |P(k,S)—0.5|<$\delta_k$ (e.g. $\delta_k$=0.02) for each or a subset of categories. The generation of synthetic code may be terminated if probability function P(k,S)>α for one category and P(k,S)<f for all the other categories, i.e. that with a sufficient certainty the input code can be classified correctly. For instance α=0.9 and β=0.1, for each category j=1, . . . , K: P(k,S)>α for k=j and P(k,S)<β for k≠j; either α, β can be defined across categories or $\alpha_k$, $\beta_k$ can be defined individually for categories paying attention to the fact that the range and amount of samples vary across categories. The generation of synthetic code may be terminated if the generator neural network has reached a predefined size. The generation of synthetic code may be terminated if a predefined number of iterations (sample generated, sample discriminated) were performed. The generation of synthetic code may be terminated if a predefined amount of computing time has been spent.

After the predefined stopping condition is met, the GAN or CatGAN generator is used to produce synthetic code to train the actual detection system. NB: The synthetic code generated in step 1 is not used to train the auto-encoder as the average quality is lower, i.e. P(S*) is not close enough to 0.5.

In accordance with the above described process, firstly the variables δ, $\delta_k$ are defined, 602. Then, the GAN or CatGAN is trained, 604, as explained above. Next, a check is made at step 606, whether the conditions are met. If that is not the case, the training 604 continues. Otherwise, the trained GAN CatGAN is used for a training of the auto-encoder, 608.

Figure 7:
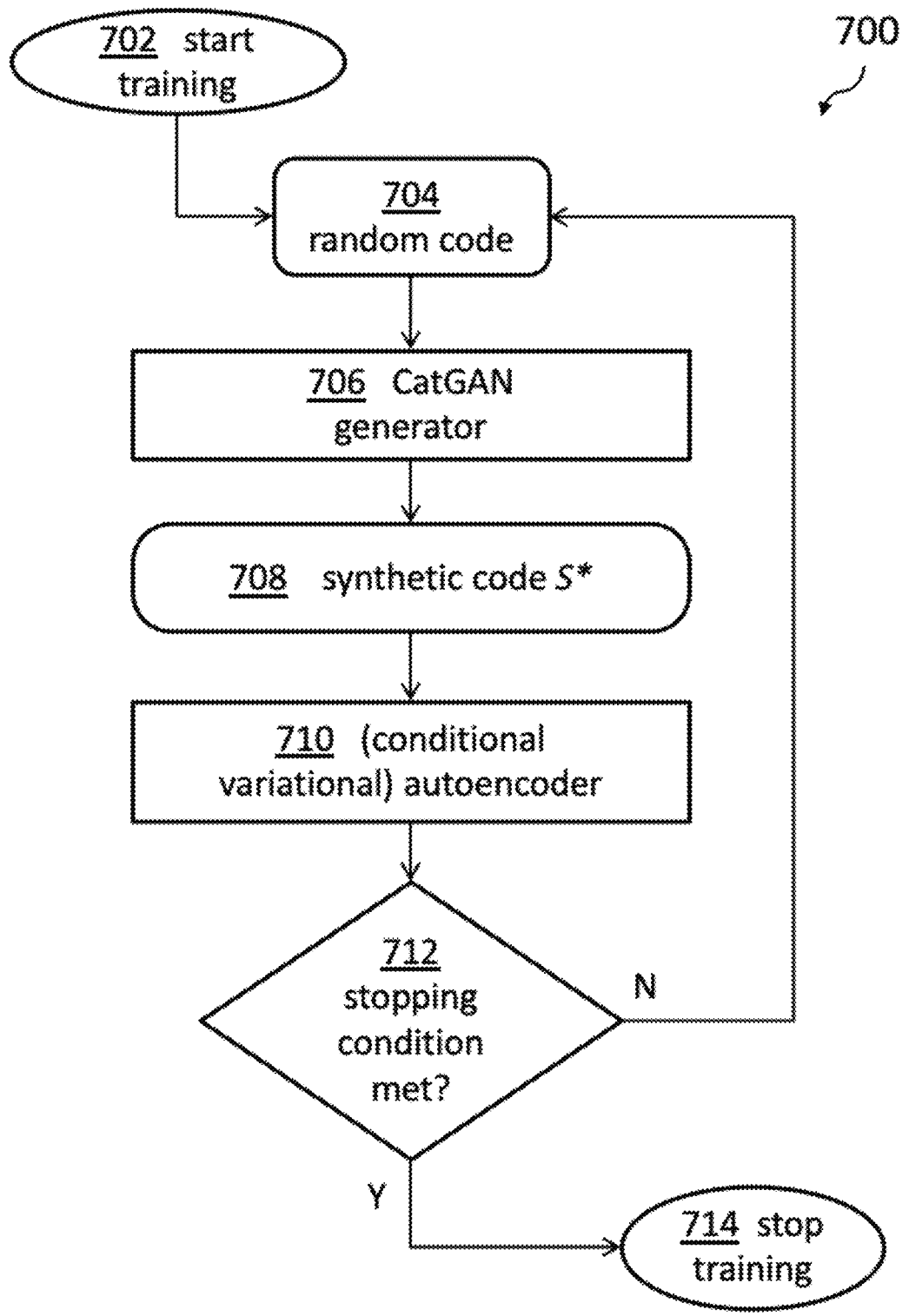
FIG. 7 depicts an exemplary block diagram of a training of the auto-encoder, in accordance with the exemplary embodiments.

FIG. 7 shows a block diagram of a training 700 of the auto-encoder according to an embodiment.

Step 2: Train an Auto-Encoder ML Model Using the Samples Generated in the Previous Step In one embodiment, the inventive concept uses an auto-encoder (AE) as the preferred embodiment of an ML detection system, in another implementation the GAN (or CatGAN) discriminator can be used, in another implementation a different ML model that can be trained with the synthetic code.

Using the GAN or CatGAN discriminator directly as a detection system has the advantage of reducing the overall computational effort (no new model has to be trained); however, depending on the capacity of the network, the GAN discriminator might not be able to detect with the same level of confidence as an AE. When the GAN or CatGAN discriminator is used as malware detector, the new sample is sent to the discriminator, and when the P(S) will be larger than a threshold, e.g., 0.8 (or another predefined value), the sample is identified as malicious. An advantage of the usage of the discriminator from the CatGAN is that in addition to the overall classification (malware vs. benevolent), also the category k of malware is detected by largest value of P(S,k).

In the preferred embodiment, the AE is trained with generated synthetic code samples as shown in the FIG. 7 below. The amount of synthetic samples generated is several orders of magnitude larger than the amount of code samples retrieved in stage 1, for example 10^6 compared to 10^2. In one implementation, the synthetic code S*708 is kept for retraining later.

According to one embodiment, the training is started, 702, the random code 704 is generated and fed to the CatGAN 706 which produced the synthetic code S*708. With these code fragments, the auto-encoder (e.g., a CVAE) is trained, 701, until a stopping condition 712 is met. If it is not met, the training continues with generating further synthetic code S*708 from the generated random code 704. If the stop condition is met, 714—case "Y"—the training of the CVAE stops, 714.

Through the training, the AE 710 will be able to reconstruct the malware with low reconstruction error, similar to the one generated and seen so far. Hence, after deployment the criteria for malware detection will be a sufficient low reconstruction error.

Following best practice, the decrease in the reconstruction error (i.e., cost function) is observed, i.e., the training is stopped if, for a predefined number of additional samples that were fed in after the last measurement of the reconstruction error, the reconstruction error has not decreased by a predefined value. The predefined number of samples and/or the predefined value can be relative (e.g., 10% more samples, decrease by 1%) or absolute (e.g., 10,000 samples, decrease by 0.01).

In another embodiment, the model trained with the synthetic data is a conditional variational auto-encoder (CVAE) 710. This allows the model to get input based on both, the category of the malware (inserted in the latent space) and the sample itself. The advantage of this method is that also during inference (i.e., in detection mode) an incoming sample can be tested against different categories of malware at the same time and for each category the result will give a (slightly) different reconstruction resulting from the decoder, hence, a different reconstruction error.

This additional dimension (i.e., the malware category k) can be used to enhance the precision of the malware detection, by having a tighter threshold for positive detection on the class that has the lowest reconstruction error. In addition, as a byproduct, the CVAE can identify the malware class (again, as the class that will produce the smallest reconstruction error).

Figure 8:
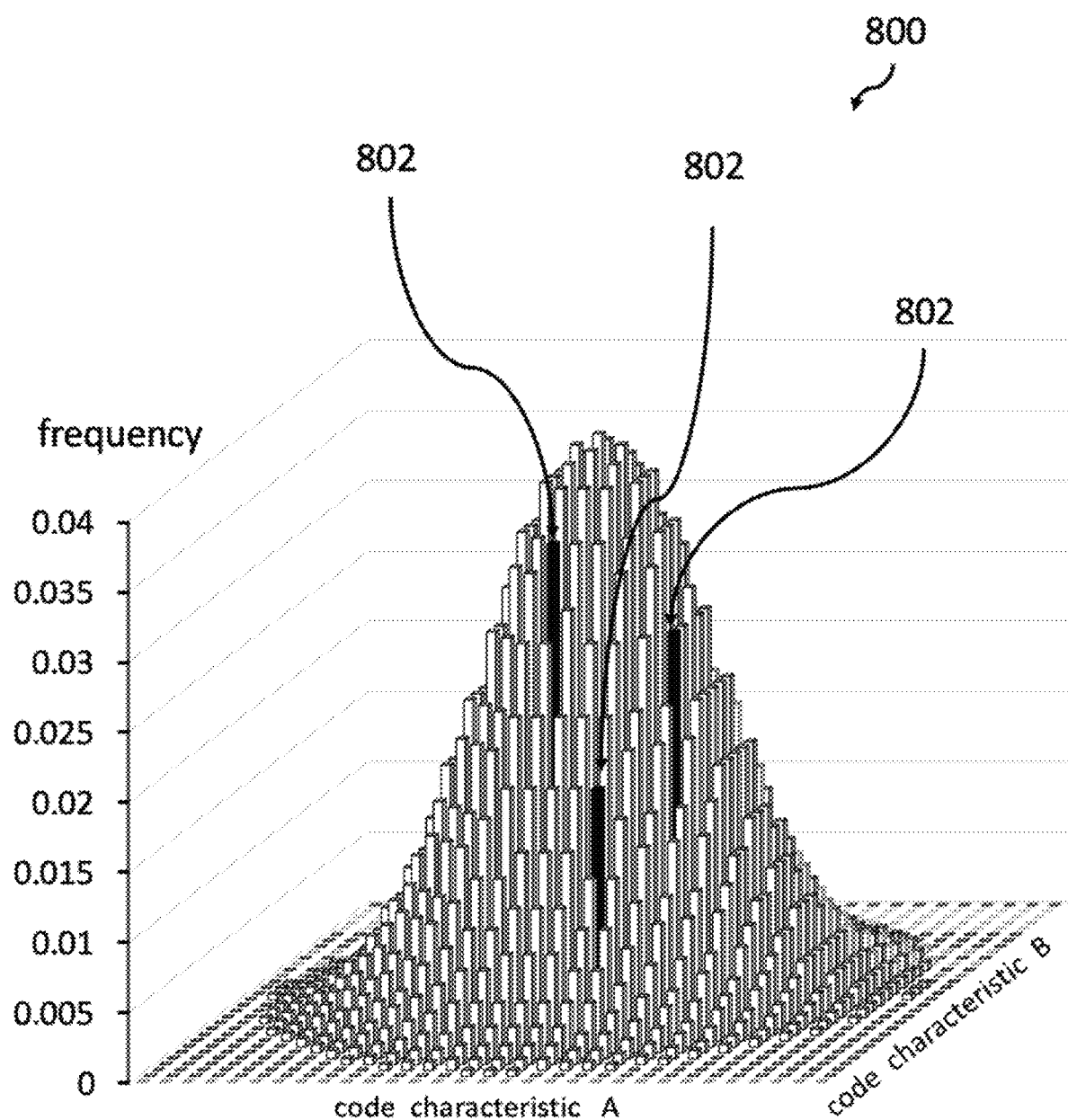
FIG. 8 depicts an example of a distribution of the synthetic code patterns in comparison to original code pattern samples with respective malware characteristics, in accordance with the exemplary embodiments.

FIG. 8 shows an example of a distribution 800 of the synthetic code patterns in comparison to original code pattern samples with respective malware characteristics. The figure illustrates the advantages of generating synthetic code: (i) a smooth distribution of code characteristics is ensured to cover the detection space well and (ii) the distribution (with descending frequency=descending detection probability) includes a wider span of code (non-existing code) which allows in principle the detection of 0 day exploits.

The figure below shows a two-dimensional simplification as the characteristics (defined by the k categories; here K=2) are multi-dimensional. The black ones 802 represent real samples from the malware or campaign database (compare FIG. 4, 416), whereas all white pillars represent results from synthetic code patterns.

Step 3: Evaluation and Deployment

Figure 9:
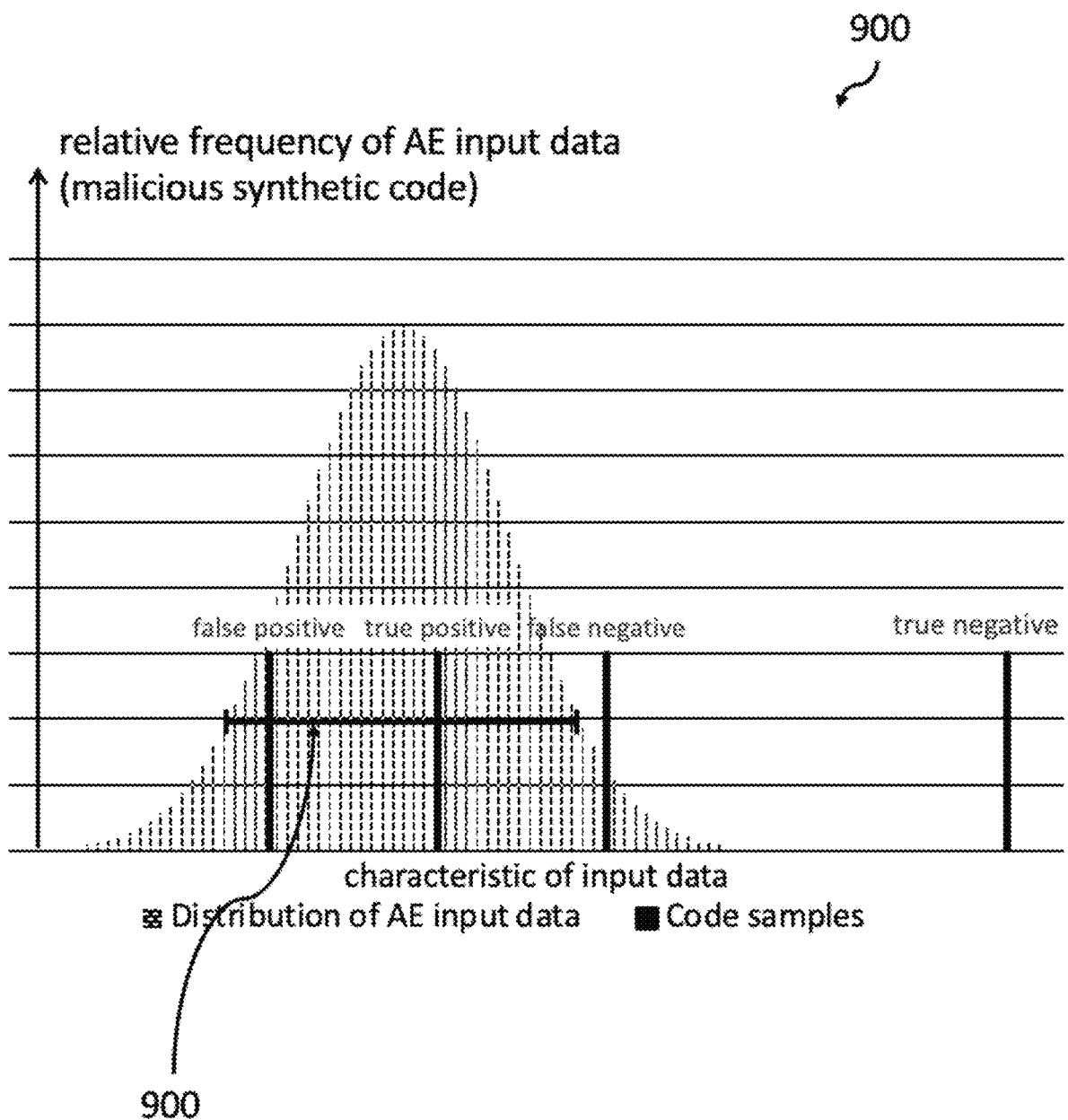
FIG. 9 depicts an example of a detection range of the auto-encoder and a detection of samples, in accordance with the exemplary embodiments.

FIG. 9 shows the 4 possible cases, correct detection of samples: true positives and true negatives; and incorrect detection false positives (benevolent code regarded as malicious) and false negatives (malicious code regarded as benevolent) as well as the detection range 902. All of them are shown as bold lines. Details of its relevance are discussed in the next figure.

Figure 10:
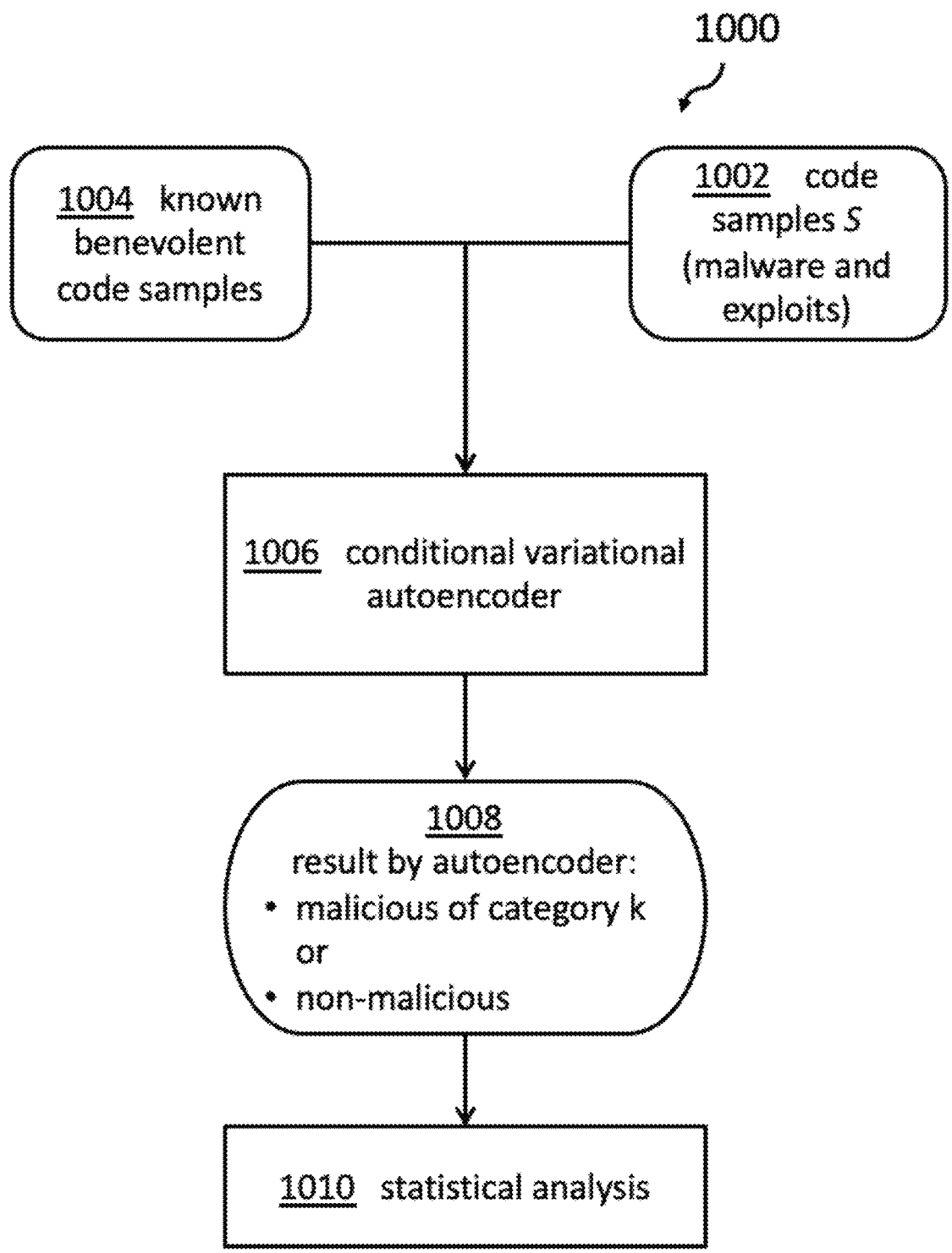
FIG. 10 depicts an exemplary flowchart of an embodiment of an evaluation of the auto-encoder and detection mode, in accordance with the exemplary embodiments.

FIG. 10 shows a flowchart 1000 of an embodiment of an evaluation (stage 3, 206, FIG. 2) of the auto-encoder and detection mode. In this stage, the ML model of the AE or CVAE is run on a known set of data, e.g., a given set of properly labeled malware and regular software.

The AE detection range (i.e., samples in this range are regarded as malicious) is defined by two parameters:

Mean squared error (MSE) as the loss function for reconstruction calculated by the AE. The MSE of a sample $MSE_{sample}$ is compared with the MSE during training $MSE_{Training}$. A relatively small MSE for a sample indicates that the sample exhibits the malicious characteristics; and Sensitivity factor (sf), a predefined value in the range of [1,0[, which is used to tune the rate between true and false positives. Where 1 is used to detect slightest anomalies (e.g., resulting in more alerts) and a low value like 0.5 reduces the false positive rate (less alerts).

In detection mode the AE or CVAE calculates the MSE between the reconstructed data and the original data of the incoming sample. Using the sensitivity factor the result is calculated as: $m=MSE_{Training}/sf—MSE_{sample}$. If the resulting value is positive (m>0), the sample is regarded a malicious code. If the resulting value is negative (m<0), the sample is regarded a benevolent code.

Thus, FIG. 10 shows also how a detection range of the auto-encoder fits into the context of FIG. 9 and how a detection of samples can be performed. In the evaluation process, malicious codes samples by category 1002 and benevolent software code pattern 1004 are fed into the CV auto-encoder 1006. As the input is known, a statistical analysis is created comprising the ratings and confidence levels 1008 for true positives with the correct category, true positives with the wrong category, false positives by category, true negatives, and false negatives.

As stated in stage 3 (stage 3, 206, FIG. 2), in the implementation using one instance of a GAN(G,D) with its generator and discriminator is fully developed and utilizing the fully developed generator for AE training, improving the AE is only possible in a limited way. In case the AE does not detect the required rate of true positives in the right category, the AE will be fed with more synthetic samples of the said category to reduce the reconstruction error.

In another implementation, which uses a series of generators with different levels of maturity $GAN_n(G_n,D)$, the shape of the determined, 1010, distribution, shown in FIG. 9, can be widened or narrowed, i.e., thereby changing the detection range.

Figure 11:
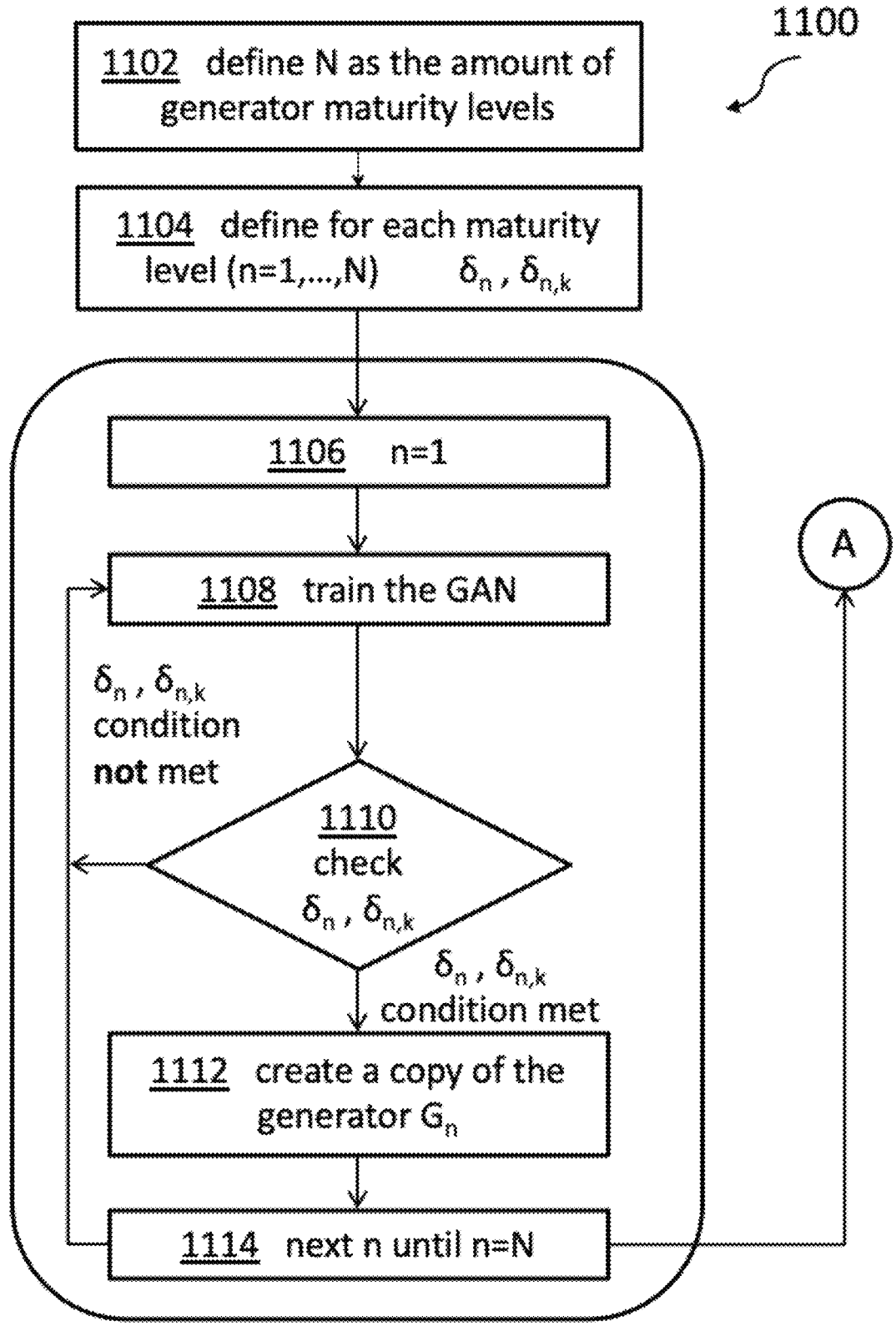
FIG. 11 depicts a first portion of a flowchart of an embodiment for using multiple generator portions of a different maturity level to train the auto-encoder, in accordance with the exemplary embodiments.

FIG. 11 shows a first portion 1100 of a flowchart of an embodiment for using multiple generator portions of a different maturity level to train the auto-encoder.

Here, the statistical analysis allows tuning the AE aiming to reduce the rate false positives and false negatives. For this purpose, series of N generators with different levels of maturity is required and defined, 1102: $GAN_n(G_n,D)$, where $\underline{n}=1, \ldots, N$, for instance N=8. For each maturity level n, a stopping condition is defined, 1104, by $\delta_n$, with $\delta_n > \delta_{n+1}$ and $\delta_N=\delta$, i.e. decreasing deviations of the probability functions from the optimal result 0.5 for an average across categories, and $\delta_{n,k}$, with $\delta_{n,k} > \delta_{n+1,k}$ and $\delta_{N,\ k}=\delta_k$ as above for each category.

Starting, 1106, with n=1, the GAN is trained, 1108. The stock criteria are checked, 1110, and a copy of the generator $G_1$ is created and stored, 1112. These different generators or generators of different maturity level can be used in a later stage. If n is not equal N or if the quality criteria is not met, the process continues with that training 1108 of the GAN. If the defined number N of iterations (which is equal to the amount of generator maturity levels) is reached, 1114, the process continues at "A" and FIG. 12.

Figure 12:
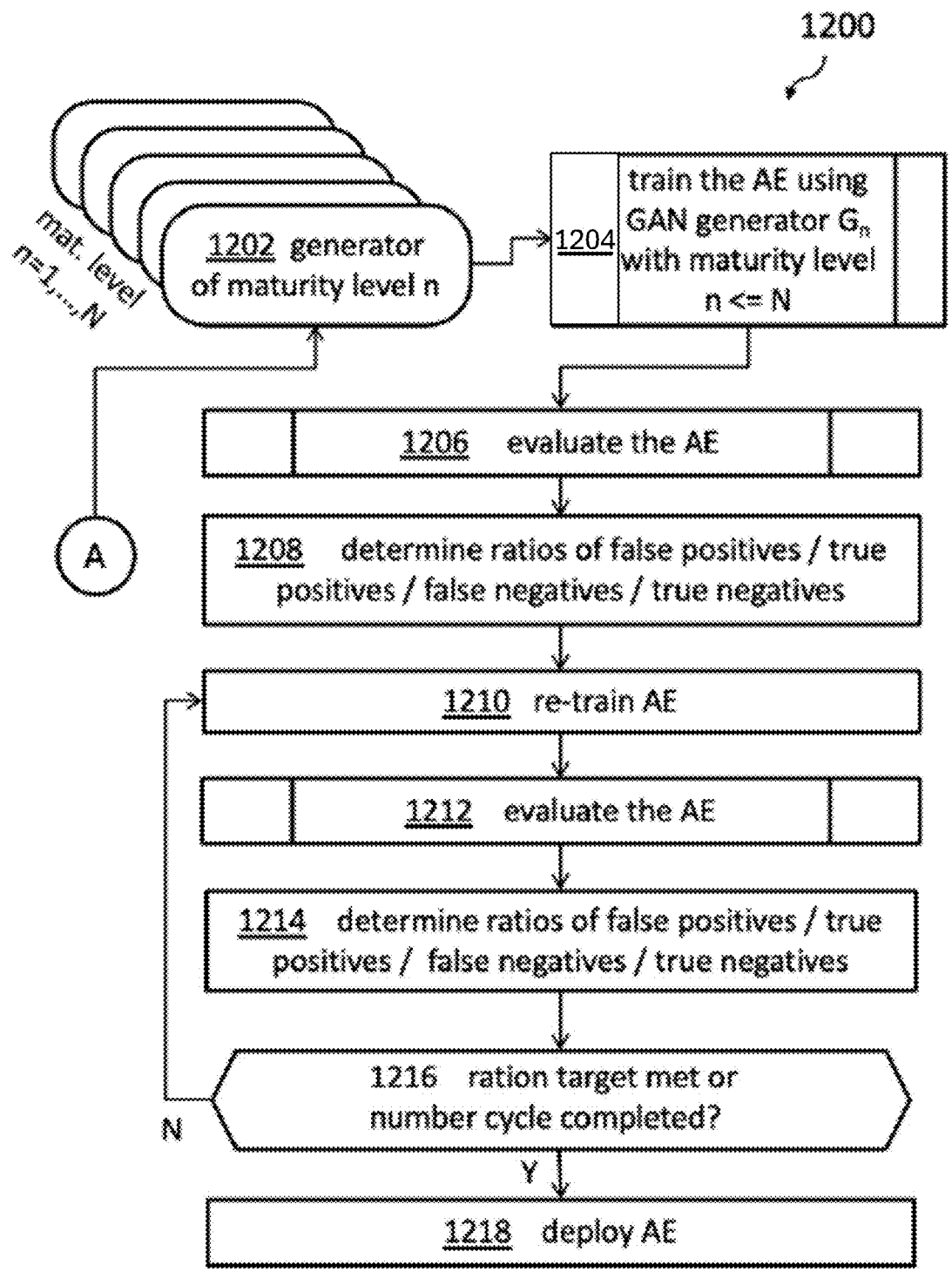
FIG. 12 depicts a second portion of a flowchart of an embodiment for using multiple generator portions of a different maturity level to train the auto-encoder, in accordance with the exemplary embodiments.

FIG. 12 shows the second portion 1200 of a flowchart of an embodiment for using multiple generator portions of a different maturity level to train the auto-encoder. Initially, the AE is trained with a generator of intermediate maturity, e.g., $G_{n=N/2}$. The stopping condition for AE training is preponed to avoid unnecessary long re-training.

Two aspects are considered when judging the quality of the AE: (i) the ability to distinguish correctly malware and benevolent software, and (ii) the ability to classify the category correctly.

In case the rate of false positives/true positives (across categories) may be too high, the distribution is too broad. The distribution is narrowed by training the AE with samples matching closely real malware characteristics, i.e., by using the most mature generator $G_N$.

In case the rate of false negatives/true negatives (across categories) is too high, the distribution shown in FIG. 9 is too narrow. The distribution is broadened by training the AE with samples exhibiting a wider range of characteristics, i.e., by using the less mature generator $G_n$.

In case the rate of false positives/true positives for a specific category k is too high, the distribution for this category is too broad. The distribution is narrowed by training the AE with samples matching closely real malware characteristics of category k, i.e. by using the most mature generator $G_N$ and using only the samples for AE training when the discriminator D has identified them as category k with a high probability.

In case the rate of false negatives/true negatives for a specific category k is too high, the distribution for this category is too narrow. The distribution is widened by training the AE with samples exhibiting a wider range of characteristics of category k, i.e., by using the less mature generator $G_n$ and using only the samples for AE training when the discriminator D has identified them as category k with a high probability.

The flow according to FIG. 11 continues in FIG. 12 at "A". For the above-mentioned cases, the generators 1202 with the different maturity levels n=1 . . . N are provided to the AE training which starts, 1204, with the generator of level N. The AE is evaluated, 1206, and the ratios of false positives/true positives/false negatives/true negatives is determined, 1208. Then the AE is retrained, 1210, as explained above. A new evaluation 1212 is performed and again the rates of false positives/true positives/false negatives/true negatives are determined, 1214.

If the ratio is achieved or met, or if the number of cycle iterations is reached, 1216—case "Y"—the AE is deployed, 1218, for malware detection. Otherwise—case "N"—the training is repeated.

Step 4: Triggering Re-Evaluation

Last but not least, the triggering of a re-evaluation of the trained system shall be discussed. After the deployment, the AE analyzes code samples coming into the production system. As the internal and external environment changes constantly, on a regular interval, it must be ensured that the detection provides still the same level of security as during deployment.

The re-evaluation may be triggered by one or a combination of the following conditions. The re-evaluation may be triggered by a certain amount of time passing since deployment. The re-evaluation may be triggered by a change in the scope of the IT environment to be protected (HW or SW), e.g. a DB flavor or an operating system type has been added. The re-evaluation may be triggered by a change in the set of known vulnerabilities of the IT environment. The re-evaluation may be triggered by a change in the threat landscape, e.g. new campaigns related to the vulnerabilities and assets of the IT environment are known, new malware families, attack patterns, or malware instances are provided by threat intelligence.

If a re-evaluation is required, the method starting with stage 1 is performed again.

Not necessarily all the method steps have to be performed, for instance if the known vulnerabilities have not changed, the vulnerability database is not updated.

Depending on the kind and extent of the changes of the internal and external environment, the existing ML model is discarded (fresh start) or is augmented with new input data. A fresh start has the advantage that the model is leaner as it does not contain malware patterns which are no longer applicable, for instance when a vulnerability does not exist anymore (e.g. after OS patching) and the corresponding malware cannot do any harm. Training the existing model with additional code requires less computational effort and is advisable when the environment is susceptible for a new kind or version of malware.

The ML models of the GAN and the AE are independent. None, one or both models can be discarded or kept. For instance, if one new kind of malware is known, in one implementation the ML model of the GAN is trained in one category with new malware samples and only new synthetic code of this category is fed into the existing AE. In another implementation the ML model of the AE is removed, and the AE is trained with all synthetic code.

Figure 13:
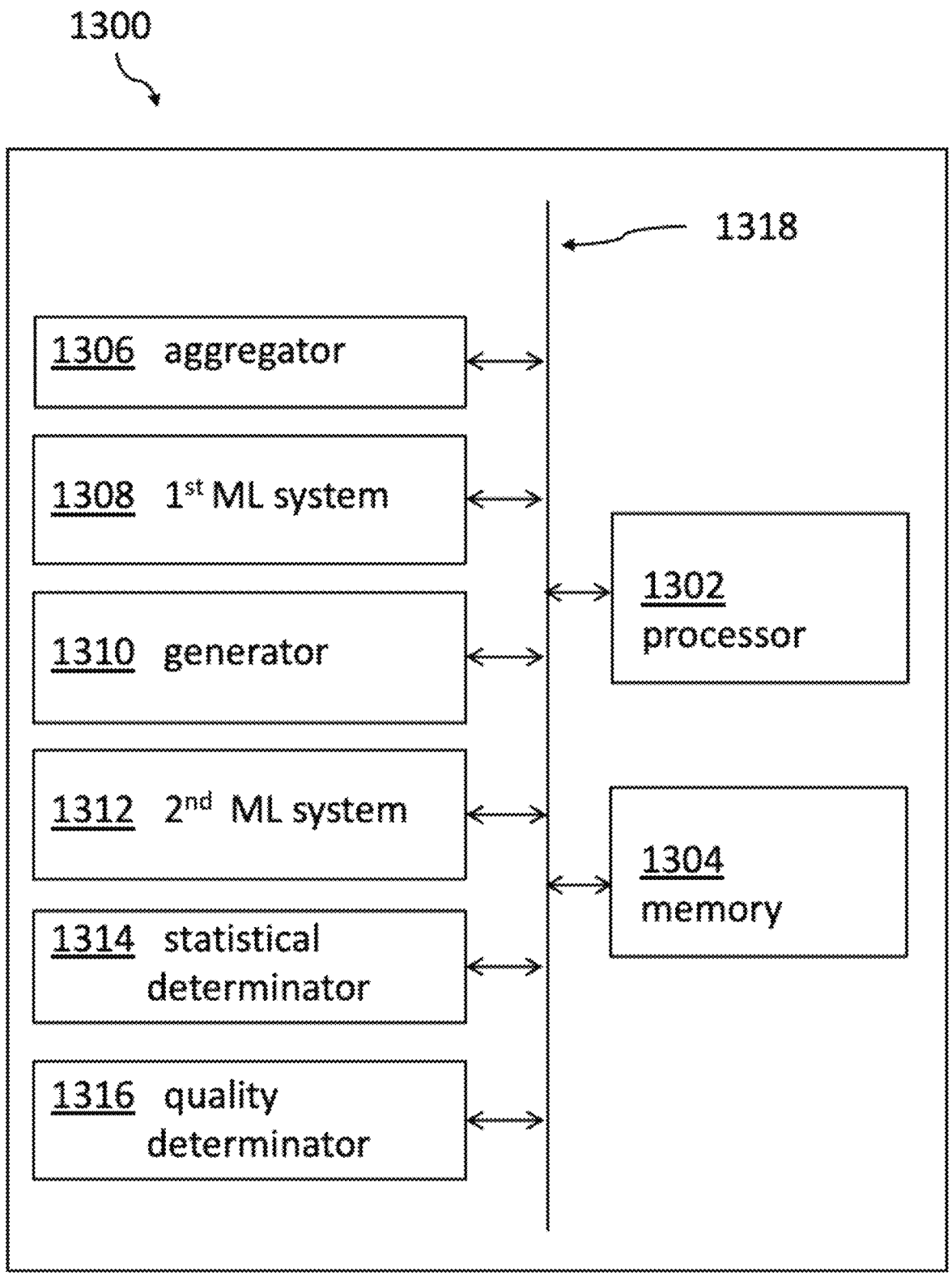
FIG. 13 depicts an exemplary block diagram of an embodiment of the multi-category machine-learning system for a detection of malware, in accordance with the exemplary embodiments.

FIG. 13 shows a block diagram of an embodiment of the multi-category machine-learning system 1300 for a detection of malware. The system comprises a processor 1302 communicatively coupled to a memory 1304, wherein the memory 1304 stored program code portions, which, when executed by the processor 1302, enable the processor 1302 to aggregate—e.g., using or triggering an aggregator or aggregator unit 1306—known malware patterns by storing the malware patterns and their related malware category, train a first machine-learning system 1308 comprising a generator portion and a discriminator portion, thereby building a first machine-learning model using, for the training, the known malware patterns and the related malware category as training data until the discriminator is unable to differentiate between known malware patterns and synthetic code patterns. Thereby, the discriminator is enabled to output a malware probability value that a synthetic code pattern is malware and a category probability value indicative of a category of the synthetic code pattern.

The stored program code portions, which, when executed by the processor 1302, enable the processor 1302 also to generate—e.g., by a generator or by triggering a generator unit 1310—additional synthetic code patterns by feeding additional random code samples to the trained first machine-learning system, and train a second machine-learning system 1312, thereby building a second machine-learning model using the generated additional synthetic code patterns and benevolent code patterns as training data until the second machine-learning system is enabled to predict malicious ones of the additional synthetic code patterns and a related categories for the additional synthetic code patterns.

Furthermore, stored program code portions, that, if executed by the processor 1302, enable the processor 1302 to determine—e.g., by a statistical determinator 1314 or by triggering it—a statistical distribution of the predicted malicious ones of the additional synthetic code patterns and related categories for the additional synthetic code patterns, and determine—e.g., using a quality determinator 1316 or triggering it—a quality value of the training of the second machine-learning system, wherein the quality value is a function of an ability of the second machine-learning system to predict correctly that one of the aggregated categorized known malware patterns is malware of a certain category.

It should also be mentioned, that all units and modules of the system 1300 may be implemented in software, in hardware or in a combination thereof. It should also be mentioned, that all units and modules, if implemented in hardware, are common and typically coupled to each other for signal and data exchange. This may be implemented in a one-to-one communication channel fashion or by connecting on modules and units to an internal communication bus system 1318. This applies in particular to the processor 1302, the memory 1304, the aggregator 1306, the first machine-learning system 1308, the generator 1310, the second machine-learning system 1312, the statistical determinator 1314, and the quality determinator 1316.

Figure 14:
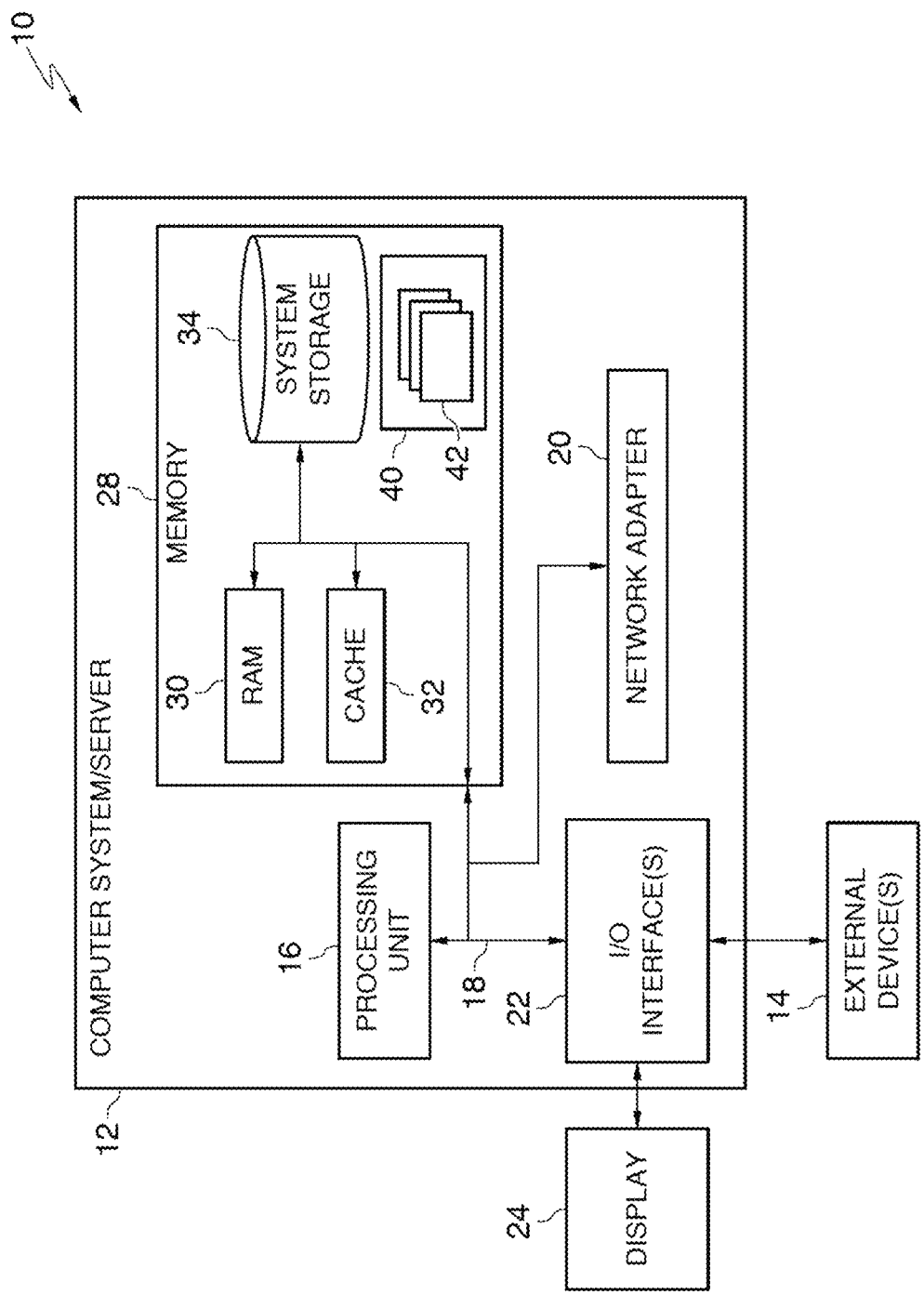
FIG. 14 depicts an exemplary block diagram depicting hardware components of a computing system comprising the multi-category machine-learning system for a detection of malware, in accordance with the exemplary embodiments.

FIG. 14 depicts a block diagram of devices within the system described above, in accordance with the exemplary embodiments. It should be appreciated that FIG. 14 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
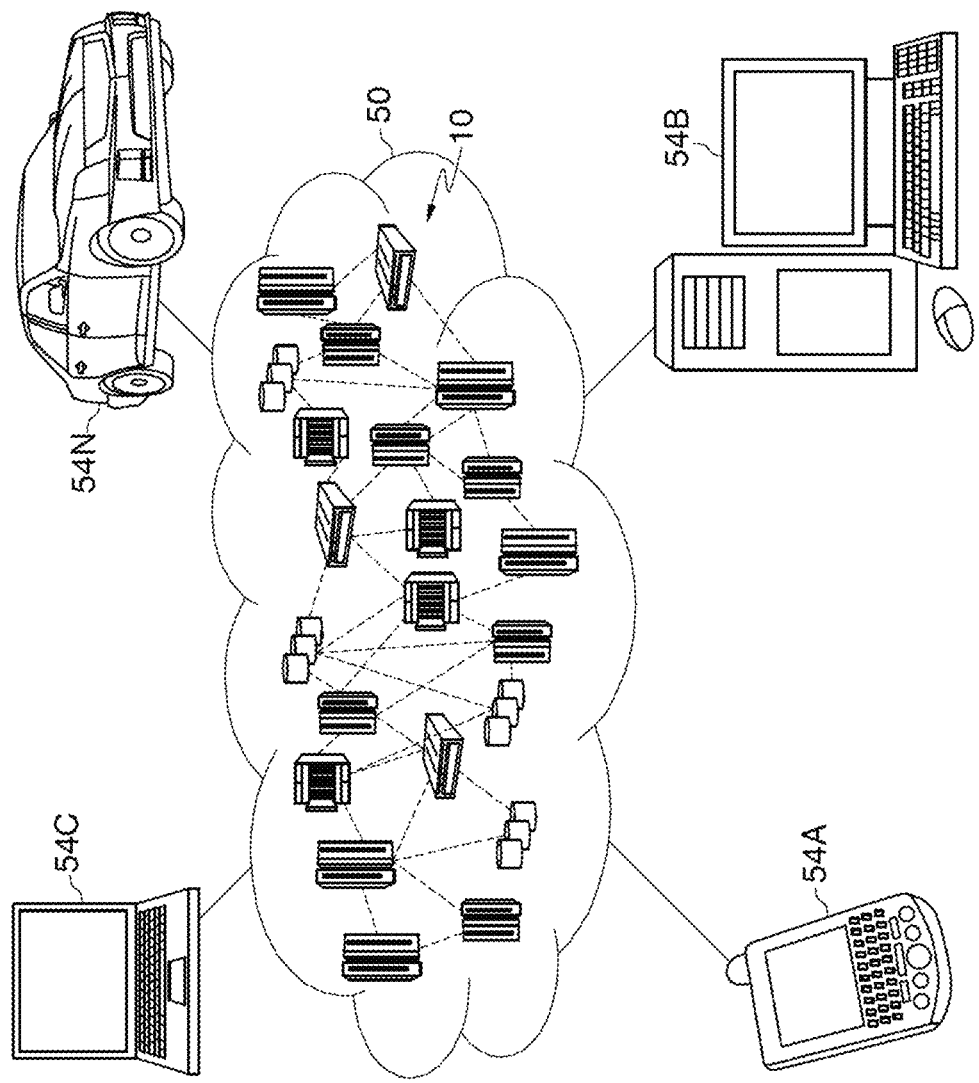
FIG. 15 depicts a cloud computing environment, in accordance with the exemplary embodiments.

Referring now to FIG. 15, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 40 and cloud computing environment 50 can communicate with any type of computerized device over any type of network and/or network addressable connection (e.g., using a web browser).

Figure 16:
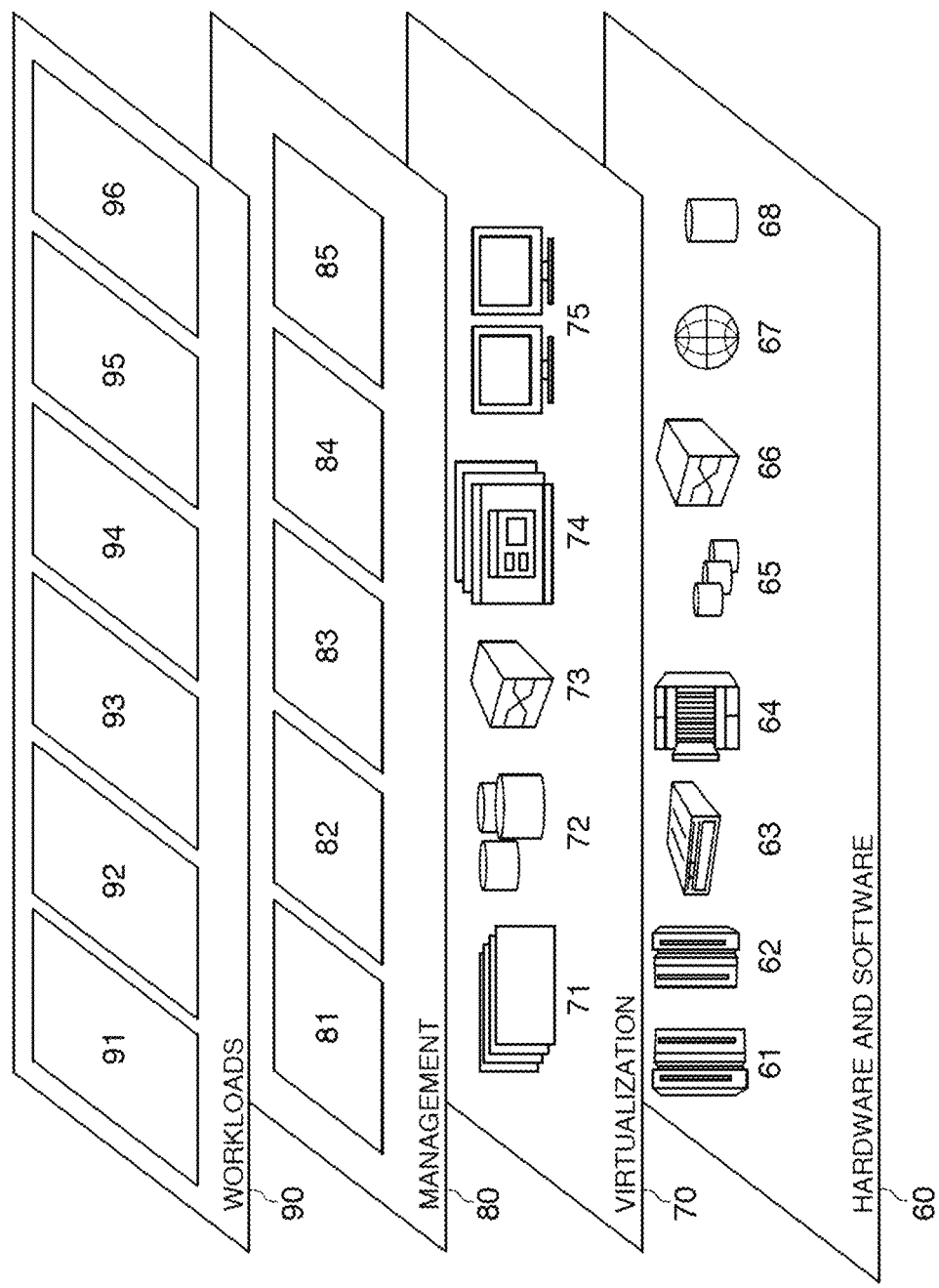
FIG. 16 depicts abstraction model layers, in accordance with the exemplary embodiments.

Referring now to FIG. 16, a set of functional abstraction layers provided by cloud computing environment 50 (FIG. 15) is shown. It should be understood in advance that the components, layers, and functions shown in FIG. 16 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and malware detection 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for building a multi-category machine-learning system for detecting malware, the method comprising:
    training a first machine-learning system, comprising a neural network that includes a generator portion and a discriminator portion, by using known malware patterns and related malware categories as training data until the discriminator portion is unable to differentiate between known malware patterns and synthetic code patterns;
    training a second machine-learning system by using benevolent code patterns and additional synthetic code patterns, generated using the trained first machine-learning system, as training data until the second machine-learning system is enabled to predict malicious code patterns of the additional synthetic code patterns and related categories of the additional synthetic code patterns;

determining a statistical distribution of predicted malicious code patterns and related categories; and determining a quality value of the training of the second machine-learning system, wherein the quality value denotes an indicator of a prediction accuracy of the second machine-learning system for predicting malware.

2. The computer-implemented method of claim 1, wherein:
the additional synthetic code patterns are generated by feeding random code samples to the trained first machine-learning system after initial training; and
the random code samples comprise categorized malware code patterns and exploit code patterns.

3. The computer-implemented method of claim 1, wherein:
the neural network is a generative adversarial network or a category-aware generative adversarial network.

4. The computer-implemented method of claim 1, wherein:
the second machine-learning system is a conditional variational auto-encoder system; and
a detection range of the conditional variational auto-encoder system is defined by mean squared error and a sensitivity factor.

5. The computer-implemented method of claim 1, wherein:
the generator portion of the first machine-learning system comprises a plurality of generator portions, each with a different maturity level value.

6. The computer-implemented method of claim 5, wherein the determining the quality value comprises:
determining false negative results, true negative results, false positive results and true positive results of a prediction for each category of the malware categories of the malware patterns;
comparing the false negative results, true negative results, false positive results and true positive results with respective predefined values; and
upon achieving a predefined result of the comparing, generating new synthetic code patterns of desired categories, training a third machine-learning system, and determining a statistical distribution with the generator portion of the first machine-learning system having a different maturity.

7. The computer-implemented method of claim 1, wherein training the first machine-learning system comprises:
determining, for the first machine learning system, a predicted category of the synthetic code pattern having a lowest probability value; and
generating more synthetic code patterns of the predicted category having the lowest probability value.

8. The computer-implemented method of claim 1, wherein the determining the quality value of the training of the second machine-learning system is performed again based on a predefined time passing since a last training, an appearance of a new malware pattern, an availability of a new malware category, a change in malware targets, or a presence of new vulnerabilities.

9. A computer system for detecting malware, the computer system comprising:
one or more computer processors, one or more computer-readable storage media, and program instructions stored on the one or more of the computer-readable storage media for execution by at least one of the one or more processors capable of performing a method, the method comprising:

training a first machine-learning system, comprising a neural network that includes a generator portion and a discriminator portion, by using known malware patterns and related malware categories as training data until the discriminator portion is unable to differentiate between known malware patterns and synthetic code patterns;

training a second machine-learning system by using benevolent code patterns and additional synthetic code patterns, generated using the trained first machine-learning system, as training data until the second machine-learning system is enabled to predict malicious code patterns of the additional synthetic code patterns and related categories of the additional synthetic code patterns;

determining a statistical distribution of predicted malicious code patterns and related categories; and determining a quality value of the training of the second machine-learning system, wherein the quality value denotes an indicator of a prediction accuracy of the second machine-learning system for predicting malware.

10. The computer system of claim 9, wherein:
the additional synthetic code patterns are generated by feeding random code samples to the trained first machine-learning system after initial training; and
the random code samples comprise categorized malware code patterns and exploit code patterns.

11. The computer system of claim 9, wherein:
the neural network is a generative adversarial network or a category-aware generative adversarial network.

12. The computer system of claim 9, wherein:
the second machine-learning system is a conditional variational auto-encoder system; and
a detection range of the conditional variational auto-encoder system is defined by mean squared error and a sensitivity factor.

13. The computer system of claim 9, wherein:
the generator portion of the first machine-learning system comprises a plurality of generator portions, each with a different maturity level value.

14. The computer system of claim 9, wherein training the first machine-learning system comprises:
determining, for the first machine learning system, a predicted category of the synthetic code pattern having a lowest probability value; and
generating more synthetic code patterns of the predicted category having the lowest probability value.

15. A computer program product for building a multi-category machine-learning system for detecting malware, the computer program product comprising:
one or more non-transitory computer-readable storage media and program instructions stored on the one or more non-transitory computer-readable storage media capable of performing a method, the method comprising:

training a first machine-learning system, comprising a neural network that includes a generator portion and a discriminator portion, by using known malware patterns and related malware categories as training data until the discriminator portion is unable to differentiate between known malware patterns and synthetic code patterns;

training a second machine-learning system by using benevolent code patterns and additional synthetic code patterns, generated using the trained first machine-learning system, as training data until the second machine-learning system is enabled to predict malicious code patterns of the additional synthetic code patterns and related categories of the additional synthetic code patterns;

determining a statistical distribution of predicted malicious code patterns and related categories; and determining a quality value of the training of the second machine-learning system, wherein the quality value denotes an indicator of a prediction accuracy of the second machine-learning system for predicting malware.

16. The computer program product of claim 15, wherein:
the additional synthetic code patterns are generated by feeding random code samples to the trained first machine-learning system after initial training; and
the random code samples comprise categorized malware code patterns and exploit code patterns.

17. The computer program product of claim 15, wherein:
the neural network is a generative adversarial network or a category-aware generative adversarial network.

18. The computer program product of claim 15, wherein:
the second machine-learning system is a conditional variational auto-encoder system; and
a detection range of the conditional variational auto-encoder system is defined by mean squared error and a sensitivity factor.

19. The computer program product of claim 15, wherein:
the generator portion of the first machine-learning system comprises a plurality of generator portions, each with a different maturity level value.

20. The computer program product of claim 15, wherein training the first machine-learning system comprises:
determining, for the first machine learning system, a predicted category of the synthetic code pattern having a lowest probability value; and
generating more synthetic code patterns of the predicted category having the lowest probability value.

* * * * *